US007757239B2

(12) United States Patent
Beck

(10) Patent No.: US 7,757,239 B2
(45) Date of Patent: Jul. 13, 2010

(54) SYSTEMS AND METHODS FOR SUSPENDING AND RESUMING OF A STATEFUL WEB APPLICATION

(75) Inventor: Stefan K. Beck, Mannheim (DE)

(73) Assignee: SAP AG, Walldorf (DE)

(*) Notice: Subject to any disclaimer, the term of this patent is extended or adjusted under 35 U.S.C. 154(b) by 1353 days.

(21) Appl. No.: 11/212,809

(22) Filed: Aug. 29, 2005

(65) Prior Publication Data
US 2007/0050449 A1 Mar. 1, 2007

(51) Int. Cl.
G06F 9/46 (2006.01)
G06F 15/16 (2006.01)

(52) U.S. Cl. ........................ 718/108; 709/203
(58) Field of Classification Search ............... 718/1–108
See application file for complete search history.

(56) References Cited

U.S. PATENT DOCUMENTS 5,911,067 A * 6/1999 Owens et al. ............... 719/310
5,961,601 A * 10/1999 Iyengar ...................... 709/229
6,049,812 A * 4/2000 Bertram et al. ............. 715/205
6,397,264 B1 * 5/2002 Stasnick et al. ............. 719/328
6,633,316 B1 * 10/2003 Maddalozzo et al. ........ 715/854
6,667,751 B1 * 12/2003 Wynn et al. ................. 715/833
6,714,962 B1 * 3/2004 Helland et al. .............. 709/203
6,813,768 B1 * 11/2004 Cragun ...................... 718/107
7,120,914 B1 * 10/2006 Manthos et al. ............. 718/108
7,228,551 B2 * 6/2007 Karagounis et al. ......... 719/313
7,506,045 B1 * 3/2009 Christensen et al. ........ 709/224
2002/0152254 A1 * 10/2002 Teng .......................... 709/100
2002/0166000 A1 * 11/2002 Rossi et al. ................. 709/328
2003/0018669 A1 * 1/2003 Kraft .......................... 707/530
2003/0225858 A1 * 12/2003 Keohane et al. ............. 709/218
2006/0070077 A1 * 3/2006 Erlandson et al. ........... 718/104

* cited by examiner

Primary Examiner—Meng-Ai An
Assistant Examiner—Adam Lee
(74) Attorney, Agent, or Firm—Mintz, Levin, Cohn, Ferris, Glovsky and Popeo, P.C.

(57) ABSTRACT

Methods and systems are disclosed for providing the integration of different Web applications into an online workflow. The methods and systems allow suspension of a first Web application, initiation of interaction with a second Web application, and subsequent resumption of the first Web application, while maintaining the state of the first Web application.

18 Claims, 6 Drawing Sheets

SYSTEMS AND METHODS FOR SUSPENDING AND RESUMING OF A STATEFUL WEB APPLICATION

BACKGROUND

I. Field of the Invention

The present invention generally relates to a model-based development and runtime environment for applications and, more particularly, to methods and systems for integrating different World Wide Web applications, located in the runtime environment, into an online workflow.

II. Background of the Invention

To gain a sustainable competitive advantage, companies seek to drive collaborative business. To achieve this goal of collaborative business, companies are continually looking to integrate their existing heterogeneous information technology (IT) landscapes and extend this integration to their business partners, customers, and suppliers.

A particular field within this heterogeneous IT landscape is Web applications. A Web application is a computer program that can be delivered to computers from a server over a network, such as the Internet or an intranet. Web applications are beneficial in that they are a part of a server-based computing model in which application processing, administration, support, and deployment are based on a centralized server. A user of a Web application may interface with the application through a user interface, such as a browser (e.g., Microsoft Internet Explorer) operating on a user's system. The user's system is usually referred to as a thin client, since very little processing of the Web application is actually done on the user's system but instead on the server. Through the Web browser, the user views and works with the Web application and data, and screen views are sent over the network connection between the user's system and the server.

The problem that exists with conventional Web applications is that they are not incorporated into one online workflow. These applications for the most part function separately. For example, a business might have a Web application designed for purchasing while a vendor to that business might have a separate Web-based catalog application. A user of the purchasing application may regularly need information from the catalog application, but these two different Web applications do not work together as part of an integrated online workflow.

Accordingly, there is a need to provide a model-based development and runtime environment for Web applications operating in conjunction with other Web applications using, for example, mechanisms such as SAP's Business Server Pages (BSP), Java Server Page (JSP), Active Server Page (ASP), and Microsoft's .Net. This model-based development and runtime environment may provide for the integration of Web applications into other Web applications, and provide customers with a more seamless workflow interaction of heterogeneous Web applications.

SUMMARY

Systems, methods, and articles of manufacture consistent with the invention provide for the suspension and resumption of an application, such that the application can be integrated into a workflow with another application.

In one exemplary embodiment, there is provided a method to facilitate an online workflow of Web applications within a model-based runtime environment. The method may include initiating a first Web application. The method may also include saving a URL of the first Web application, when an event indicates that a second Web application is being initiated. The method may further include suspending the operation of the first Web application, when the event indicates that the second Web application is being initiated. Moreover, the method may initiate the second Web application. Furthermore, the method may include resuming the first Web application based on the saved URL, after the first Web application has been suspended.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
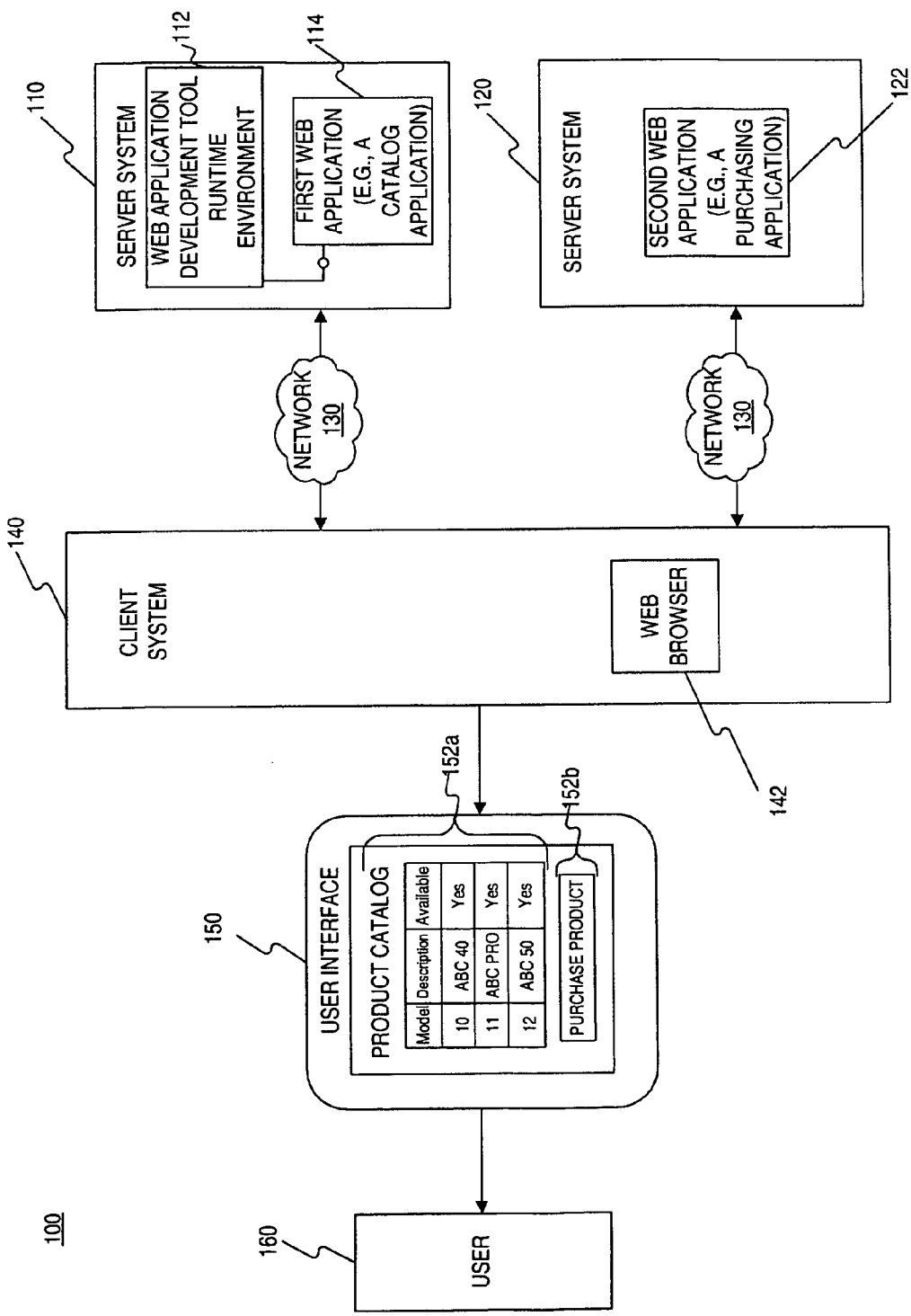
FIG. 1 illustrates a block diagram of an exemplary system environment consistent with certain aspects related to the present invention.

FIG. 1 illustrates a block diagram of an exemplary system environment 100. As shown, system 100 includes servers 110 and 120, network connections 130, a client 140, a user interface 150, and a user 160 of system 100.

In one embodiment consistent with aspects related to the present invention, user 160 instantiates first Web application 114 through Web browser 142. As used herein, the term "instantiate" means, in an object oriented programming environment, an object of a particular class, and, more generally, includes deploying, customizing, running and/or executing an application. As used herein, a "Web browser" means a computer program for providing a graphical interface that allows a user to interact with first Web application 114 by, for example, entering data, clicking buttons, clicking icons, selecting menu options, and so forth. User interface 150 provides a window or a view for allowing interaction with first Web application 114, and may operate with browser 142 to control operation and display of data in a window of browser 142. For example, first Web application 114 may be a catalog application that allows user 160 to view products, as depicted by window 152a showing various products of a product catalog. When an event, such as a button click at browser 142, indicates that a connection to second Web application 122 will occur, client 140 suspends operation of first Web application 114, saves the Uniform Resource Locator (URL) of application 114, and then exits suspended first Web application 114. In some implementations, when the URL is saved of first Web application 114, client 140 saves state information associated with first application 114, so that upon resumption of first application 114, it can be resumed with the saved state information even after first application 114 has been terminated. Client 140 then connects to second Web application 122 and instantiates second application 122. In this example, second application 122 may be a purchasing application used in conjunction with catalog application 114. User 160 may then view data associated with second application 122 through Web browser 142 and view 152b. When second Web application 122 completes processing (e.g., completing the requested purchasing transaction or requesting a product from the catalog of application 114), that event indicates to client 140 that first Web application 114 can be resumed. To resume, client 140 returns to the suspended first application by connecting to the URL of the first application 114, which was previously saved before the suspension. If any state information of first Web application 114 was saved as part of suspension, client 140 may also retrieve the saved state information when resuming application 114. User 160 then returns to viewing data associated with first application 114 through browser 142 and view 152a. As such, the suspension of first Web application 114, the instantiation of second Web application 122, and the later resumption of first Web application 114 integrate the two applications into an on-line workflow.

Servers 110 and 120 may include one or more processors, such as computers, with an application, such as a database server or an application server. Although servers 110 and 120 are separate, they may alternatively include a plurality of databases and application servers, which may be interconnected. Stored within server 110 is a programming model for user interfaces 112 (labeled "Web Application Development Tool Runtime Environment"). Specifically, programming model 112 may comprise a model-based development and runtime development environment capable of generating code to create ready-to-run Web applications for different runtime platforms. Model-based development environments are commercially available, such as Advanced Business Application Programming (ABAP, available from SAP, Walldorf, Germany), Java 2 Platform, Enterprise Edition (J2EE), Microsoft's NET. Although development environments are described, any other type of environment may be used.

Server 110 may include a first Web application 114. First Web application 114 may be any application including, for example, a Web application for use as a catalog application. For example, catalog application 114 allows user 160 to view products and their descriptions. Server 120 may include a second Web application 122. Second Web application 122 may be any application, such as a Web application used for purchasing. Although applications 114 and 122 are separate Web applications, when applications 114 and 122 are integrated into an online workflow, the applications work together as part of an online workflow.

Although the above describes specific examples of a purchasing application and a catalog application, other applications could be used. Furthermore, although servers 110 and 120 each depict only a single Web application, servers 110 and 120 can each have a plurality of Web applications.

Network connections 130 may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide network connections 130. Moreover, network 130 may be embodied using bi-directional or unidirectional communication links. Further, network connections 130 may implement protocols, such as Transmission Control Protocol/Internet Protocol (TCP/IP), Hyper Text Transfer Protocol (HTTP), Sample Object Access Protocol (SOAP), Remote Procedure Call (RPC), and the like.

Client 140 may include one or more processors, such as computers, used to interface with servers 110 and 120. Moreover, client 140 may be implemented as a client to servers 110 and 120. Client 140 may include a browser 142 to interface to applications 114 and 122. Browser 142 may be used to display content to and/or from applications 114 and 122. Moreover, client 140 may also include user interface 150, which is used in conjunction with browser 142 to provide an interface to user 160. User interface 150 may also control the display of information to user 150, and control the interaction with Web applications 114 and 122. In some implementations, SAP's Web Dynpro is used as a model-based development environment for generating user interface 150.

The input data and actions of a Web application are transmitted from servers 110 and 120 to client 140 through network connection 130. The input data and actions of user 160 are transmitted from client 140 to a Web application through network connection 130 using standard protocols (e.g., TCP/IP, HTTP, SOAP etc.). Layout and output data of Web applications 114 and 122 are transmitted from servers 110 and 120 to client 140 for display through browser 142 and user interface 150. The layout and output data may be configured and published using description languages, such as Hyper Text Transfer Markup Language (HTML), Extensible Markup Language (XML), JavaScript, or Wireless Application Protocol (WAP). The published data being viewed through windows 152a and 152b.

User 160 may view and interact with Web applications and any corresponding output data through user interface 150 of client 140. User interface 150 may be any user interface mechanism. For illustrative purposes, graphical representations of screen shots (also referred to as windows or views) 152 of Web applications are depicted. Screen shot 152a may include standard user interfaces (e.g. buttons, edit fields, and tables). Furthermore, screen shot 152a may be rendered by user interface 150 and browser 142 at, for example, runtime, when user 160 interacts with first Web application 114. When user 160 selects second Web application 122, client 140 suspend first application 114, so that user 160 can interact with second Web application 122 through user interface 150 and browser 142, which renders any data associated with second application 122 at view 152b. Although client 140 is described herein as suspending and resuming first Web application 114, user interface 150 may, as part of a control function, suspend and resume first Web application 114. Alternatively, suspend and resume can be located in any component of system 100, such as in servers 110 and 120.

Figure 2:
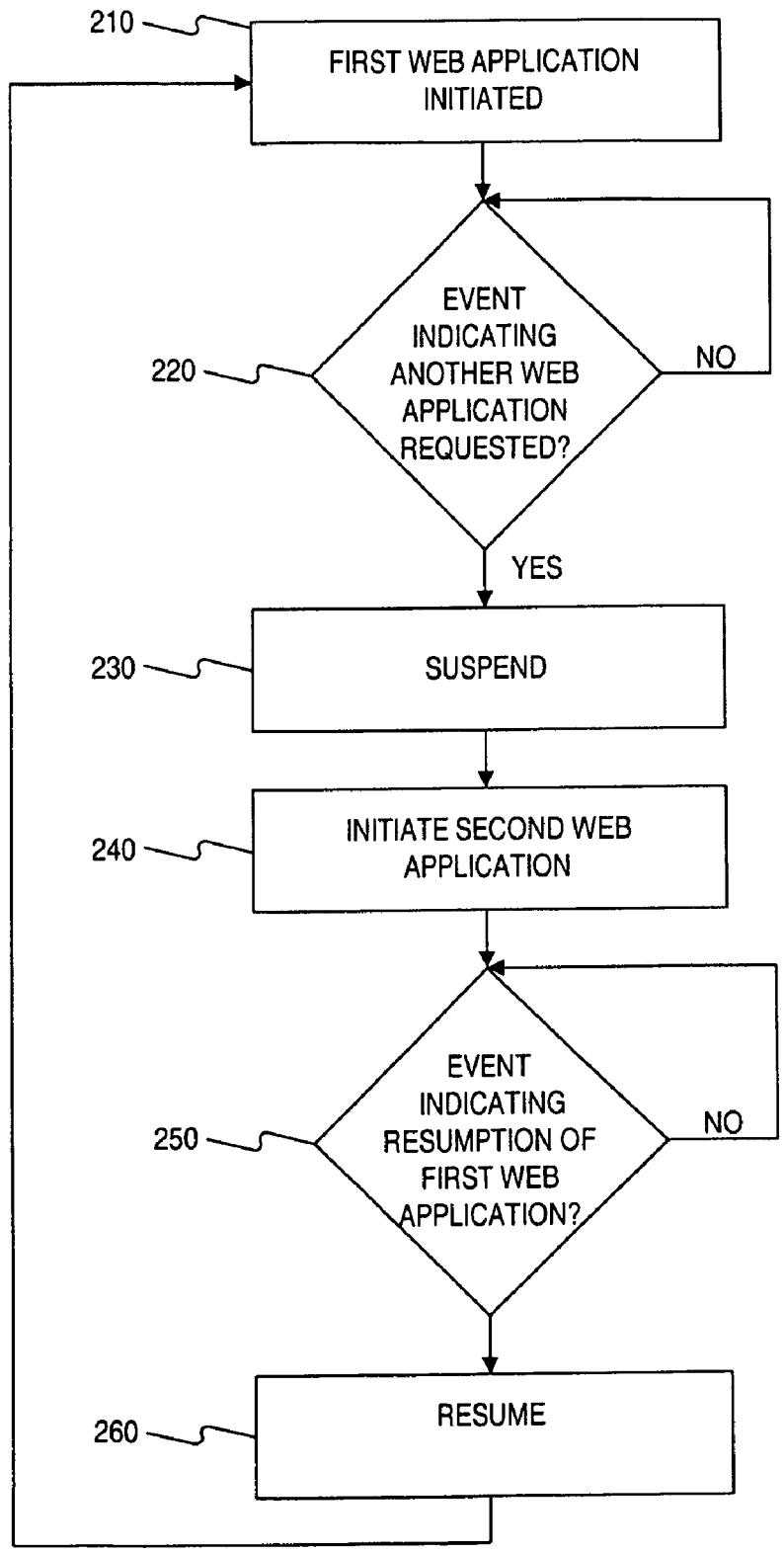
FIG. 2 illustrates a flowchart of exemplary suspend and resume operations consistent with certain aspects related to the present invention.

FIG. 2 illustrates a flowchart of exemplary steps associated with suspension and resumption operations consistent with some of the features related to the present invention. Initially, user 160 may request the initiation of first Web application 114 within a run-time environment, such as a model-based runtime environment (step 210). For example, user 160 may connect to first Web application 114 to interact with that application. As noted above, an example of first Web application 114 is a catalog application. Web browser 142 identifies the location of first Web application 114 by its specified URL. Once first Web application 114 is found using the URL, a connection is made with the application though network connection 130, and data can thus be exchanged between client 140 and first Web application 114.

Figure 3:
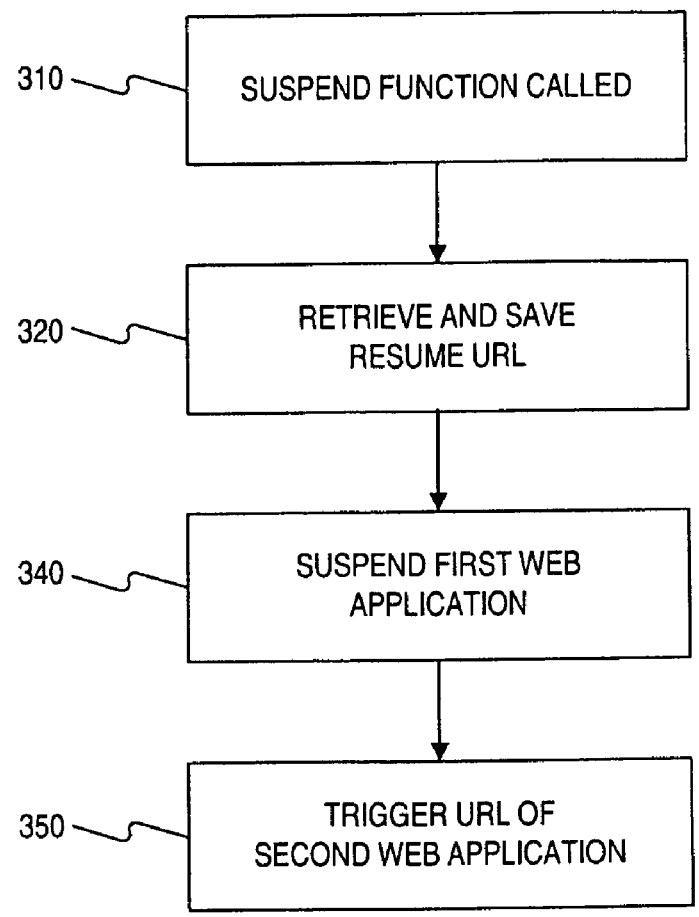
FIG. 3 illustrates a flowchart of an exemplary operation associated with a suspend consistent with certain aspects related to the present invention.

User 160 may at some point wish to initiate second Web application 122. Therefore, client 140 (or user interface 150) monitors events to determine when second Web application 122 has been requested (step 220). When second Web application 122 has been requested, client 140 determines that an event has occurred that requires first Web application 114 to be suspended (step 230). In some implementations, user interface 150 defines the event in an event handler. Client 140 then suspends first Web application 114, and saves the state of application 114 including data and view 152. For example, saving the state may consist of saving the data entered by the user or saving the navigation path (e.g., the URL). Moreover, the saved state may be saved within the session context of the application. The session context is located in the main memory of the server. Alternatively, the session context may be stored to another storage mechanism, such as a database. Then, a connection to the URL for second Web application 122 is made, so that second Web application 122 can be initiated (step 240). Further details of the suspension are illustrated in FIG. 3 below. Once a connection is made between second Web application 122 and client 140, client 140 monitors for an event to resume first Web application 114 (step 250). For example, the event may consist of a user selecting a product of a catalog, prompting client 140 to resume the first Web application. If an event does not occur, second Web application 122 continues to run. If an event does occur, client 140 resumes first Web application 114 from its suspended state. Further details of resume are illustrated below with respect to FIG. 5. FIG. 2 thus depicts steps for allow the two applications to work together—forming an integrated workflow.

In one exemplary embodiment, user interface 150 includes a controller that defines a "Suspend" function that suspends first application 114 and initiates the Web application corresponding to an event prompting the suspension. The Suspend function may take the following form:

Suspend [a, b, c . . . ]

where a, b, c, and so forth are parameters of the suspend function. For example, the URL of first Web application 114 can be used as a parameter to allow resumption to application 114. Moreover, the parameters may be defined to be of a certain type, such as a variable, integer, float, and so forth.

FIG. 3 illustrates a flowchart of an exemplary operation of the Suspend function consistent with some of the features related to the present invention. When an event indicates that second Web application 122 has been requested by client 140, the suspend function is implemented by client 140 (or user interface 150) (step 310). As part of suspend, the current URL of first Web application 114 must be retrieved from client 140 and saved, so that client 140 can later resume to first Web application 114 (step 320). Moreover, the suspend function may be associated with one or more parameters, such as the URL of first Web application 114. Client 140 then proceeds to suspend first Web application 114, and the URL of second Web application 122 triggers a connection to the second application 122 (steps 340-350). When first Web application 114 is suspended, application 114 is not terminated at client 140 or server 110, but instead continues to run in a suspended state. In a suspend state, the application session may still be active. The application may receive an event that places the application into a suspend mode. The application may then take certain steps to reduce the session state, such as reduce or release large data contexts that can be readily re-read from a database rather than stored in memory by the application. To prevent the suspended Web application from being suspended indefinitely, session handling capabilities may be implemented.

Figure 4:
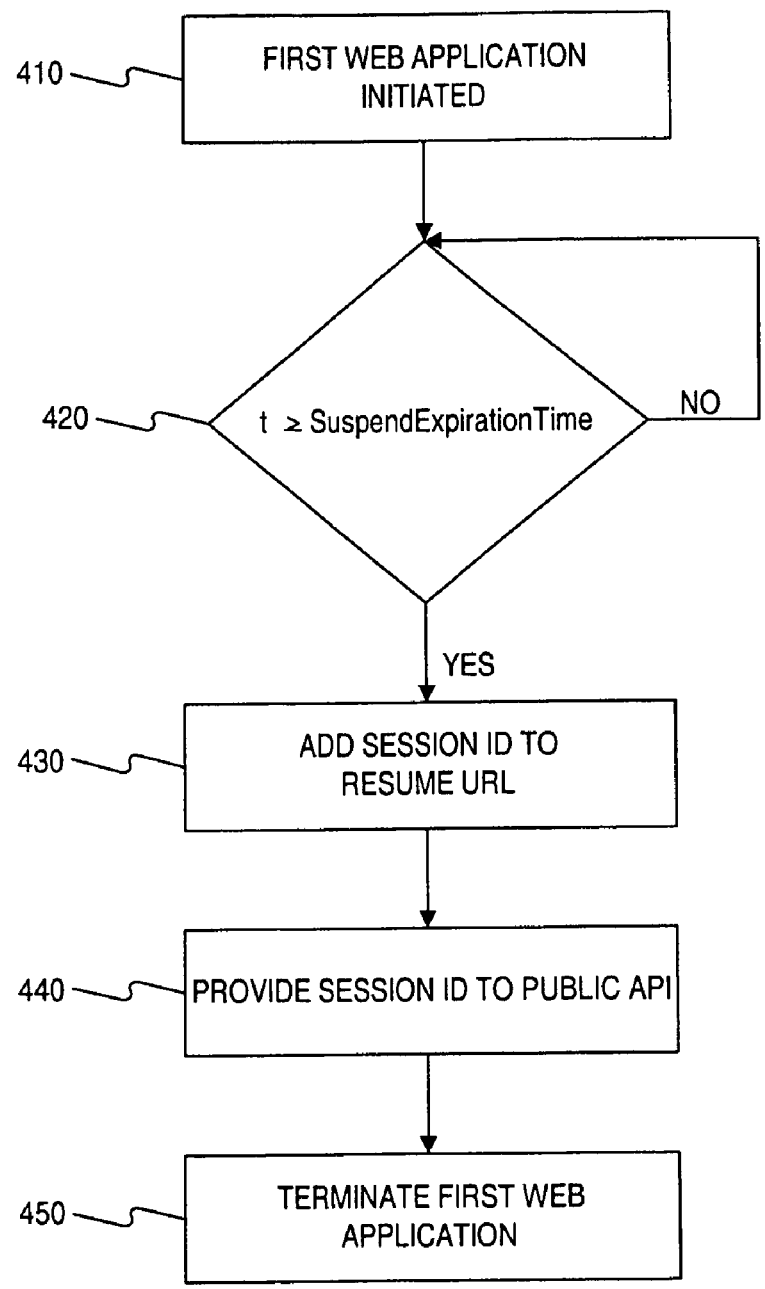
FIG. 4 illustrates a flowchart of an exemplary session handling associated with suspend and resume operations consistent with certain aspects related to the present invention.

FIG. 4 illustrates a flowchart of an exemplary operation of the session handling capabilities used during suspend and resume. When first Web application 114 is placed in a suspended state (step 410), if it continues to run within client 140, it may be utilizing system resources, such as memory or central processing unit utilization—albeit at a reduced utilization when compared to not utilizing a suspension. As such, the amount of time that first Web application 114 is allowed to remain in a suspended state running in client 140 may be limited (step 420). FIG. 4 shows steps designed with a "suspendExpirationTime" value. This value specifies the duration of time before session handling actions are taken. The user can set the "suspendExpirationTime" value, or the system can set it based on experience. In any event, the period is provided to client 140. If the time limit of "suspendExpirationTime" is not reached, the process repeats (No at step 420). When the time limit is reached (YES at step 420), client 140 adds, as a parameter, a session identification to the previously saved URL (step 430). The use of a session identification may be used to recover the state of a timed out first Web application 114. For example, before first application 114 times out, client 140 may determine that it has a pending suspend waiting for a resume. If that is the case, first Web application 114 may save its session identification and state (e.g., any data, views, and protocol states), so that even after first Web application 114 times out, client 140 can still recover its saved state and resume application 114 even after termination. In some implementations, the session identification and state information of first application 114 may be provided to a public Application Program Interface (API) (step 440). Through the public API, first Web application 114 may provide its state and session identification to, for example, an application at server 110 or 120, so that the application can save the state information and session identification of application 114. After timing out, first Web application 114 is terminated (step 450).

Figure 5:
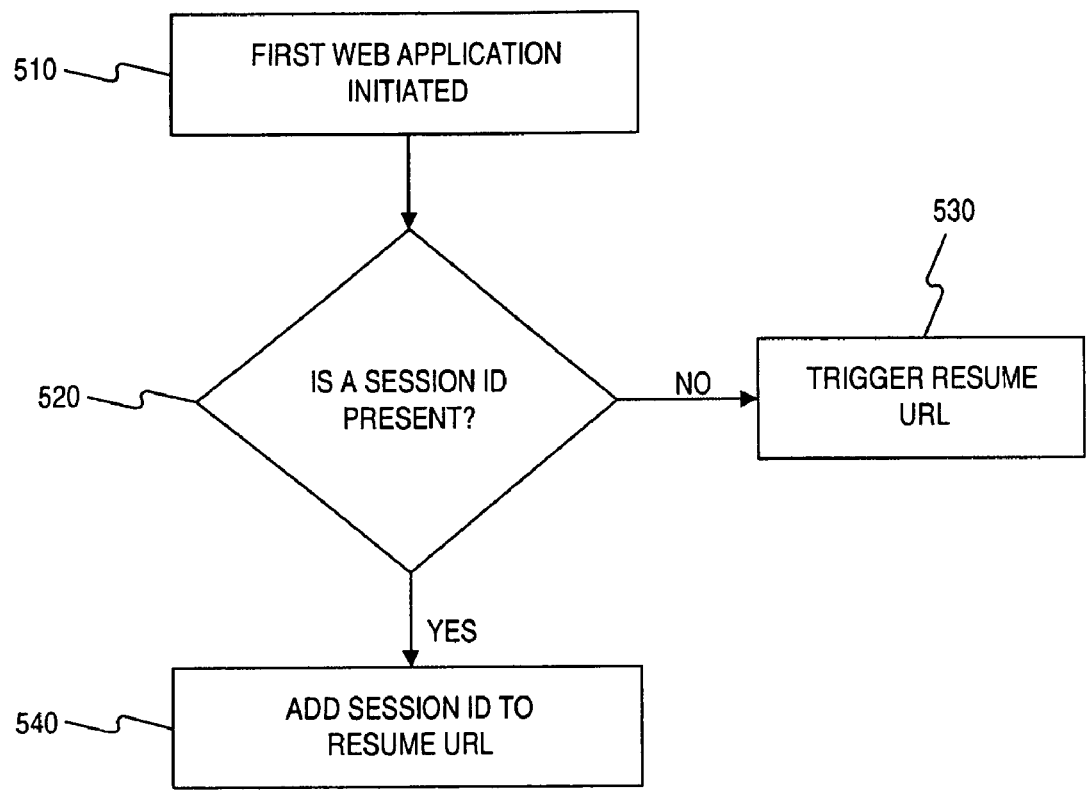
FIG. 5 illustrates a flowchart of an exemplary operation associated with the resume operations consistent with certain aspects related to the present invention.

FIG. 5 illustrates exemplary steps for resumption of first Web application 114 based on whether a session identification is present. When resuming first Web application 114 (step 510), client 140 may determine whether there is a session identification present for first Web application 114 (step 520). The presence of the session identification represents the termination of the first Web application 114, with its session identification and state information saved in, for example, server 110. If there is no session identification present, first Web application 114 is still in a suspended state running within the client 140. If first Web application 114 is still in a suspended state running within client 140, client 140 can resume directly to previously stored URL (step 530). If there is a session identification, first Web application 114 has terminated, so the session identification is used as a parameter when resuming. As such, client 140 can resume to the URL of first application 114 and use the session identification to recover the saved state at server 110 (step 540). Specifically, the session identification may include session identification value, a client window identification value, and an application instance identification value, all of which are included within the resume URL. The session identification thus allows first Web application 114 to retrieve the saved data after termination, so that browser 142 can display the appropriate data at user interface 150.

Figure 6:
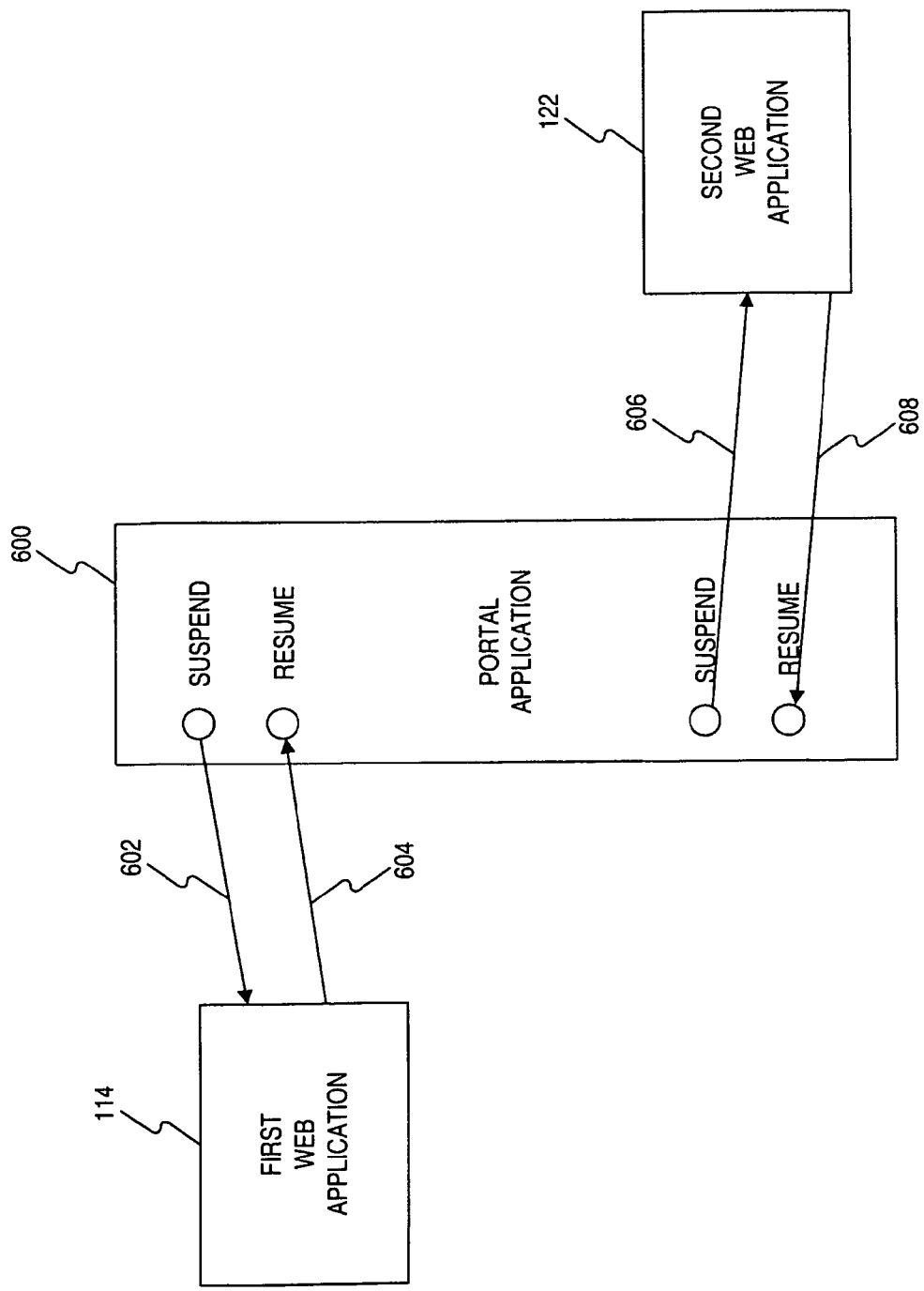
FIG. 6 illustrates a block diagram of a portal application using suspend and resume operations consistent with certain aspects related to the present invention.

FIG. 6 depicts a portal application 600 for interacting one or more Web applications, such as applications 114 and 122. Portal 600 may be implemented with a browser 142 and user interface 150, which is configured to allow suspension of Web applications and later resume the suspended applications. Moreover, portal application 600 can integrate the workflow of first and second applications 114 and 122. In particular, portal application 600 can suspend first Web application 114 and resume 604 when it receives the result from first Web application 114. Then, portal application 600 can suspend 606 second application 122 and resume 608 when it receives the result from second application 122. By use of the portal application 600, applications 114 and 122 do not need to be designed to support the suspend and resume.

The systems herein may be embodied in various forms including, for example, a data processor, such as the computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include machine code, such as produced by a compiler, and files containing a high level code that can be executed by the computer using an interpreter.

Although the description of system 100 is made in the context of a client-server environment, any other environment can be used.

What is claimed is:

1. A method for providing an online workflow of Web applications within a model-based runtime environment, comprising:

suspending operation of a first Web application that is provided by a first server system over a network to a client machine for display via a user interface of a browser at the client machine, the suspending occurring when the client machine detects an event indicating that a second Web application is being initiated, the suspending comprising saving a URL of the first Web application and removing from a memory associated with the first Web application some of the contents of the memory;

initiating the second Web application, the initiating comprising providing a second view of data associated with the second Web application through the user interface of the browser; and resuming the first Web application after the second Web application completes processing, the resuming comprising connecting to the saved URL of the first Web application from the client machine and resuming the first Web application based on the saved URL and on a window identification value.

2. The method of claim 1, wherein saving the URL of the first Web application further comprises: receiving the event in an event hander, the received event indicating the second Web application is being initiated.

3. The method of claim 1 further comprising: terminating the suspended first Web application if a predetermined time value has been exceeded since suspension of the first Web application.

4. The method of claim 3, further comprising: saving for the first Web application, a session identification value and a corresponding state, the state representative of the first Web application before terminating the first Web application.

5. The method of claim 4 further comprising: determining, upon resuming the first Web application, whether the session identification value has been saved for the first Web application, the saved session identification value corresponding to the first Web application being terminated.

6. The method of claim 5, wherein resuming the first Web application further comprises: retrieving the saved session identification value and the corresponding state when the determining step indicates that the first Web application has been terminated.

7. The method of claim 1, wherein a majority of processing associated with the first Web application occurs at the first server system and the first view is sent from the first server system to the client machine over the network.

8. The method of claim 1, wherein the second web application is provided by a second server system over the network to the client machine, a majority of processing associated with the second Web application occurs at the second server system, and the second view is sent from the second server system to the client machine over the network.

9. A system for providing an online workflow of applications, the system comprising:

a processor; and a memory, wherein the processor and the memory are configured to perform a method comprising:

suspending operation of a first Web application that is provided by a first server system over a network to a client machine for display via a user interface of a browser at the client machine, the suspending occurring when the client machine detects an event indicating that a second Web application is being initiated, the suspending comprising saving a URL of the first Web application and removing from a memory associated with the first Web application some of the contents of the memory;

initiating the second Web application, the initiating comprising providing a second view of data associated with the second Web application through the user interface of the browser; and resuming the first Web application after the second Web application completes processing, the resuming comprising connecting to the saved URL of the first Web application from the client machine and resuming the first Web application based on the saved URL and on a window identification value.

10. The system of claim 9, wherein saving the URL of the first Web application further comprises: receiving the event in an event hander, the received event indicating the second Web application is being initiated.

11. The system of claim 9, wherein the method further comprises: terminating the suspended first Web application if a predetermined time value has been exceeded since suspension of the first Web application.

12. The system of claim 11, further comprising: saving for the first Web application, a session identification value and a corresponding state, the state representative of the first Web application before terminating the first Web application.

13. The system of claim 12 further comprising: determining, upon resuming the first Web application, whether the session identification value has been saved for the first Web application, the saved session identification value corresponding to the first Web application being terminated.

14. The system of claim 13, wherein resuming the first Web application further comprises: retrieving the saved session identification value and the corresponding state when the determining step indicates that the first Web application has been terminated.

15. A computer-readable medium containing instructions to configure a processor to perform a method for providing an online workflow of applications, the method comprising:
suspending operation of a first Web application that is provided by a first server system over a network to a client machine for display via a user interface of a browser at the client machine, the suspending occurring when the client machine detects an event indicating that a second Web application is being initiated, the suspending comprising saving a URL of the first Web application and removing from a memory associated with the first Web application some of the contents of the memory;
initiating the second Web application, the initiating comprising providing a second view of data associated with the second Web application through the user interface of the browser; and
resuming the first Web application after the second Web application completes processing, the resuming comprising connecting to the saved URL of the first Web application from the client machine and resuming the first Web application based on the saved URL and on a window identification value.

16. A computer-readable medium containing instructions to configure a processor to perform a method for providing an online workflow of applications, the method comprising:
suspending operation of a first Web application that is provided by a first server system over a network to a client machine for display via a user interface of a browser at the client machine, the suspending occurring when the client machine detects an event indicating that a second Web application is being initiated, the suspending comprising saving a URL of the first Web application;
initiating the second Web application, the initiating comprising providing a second view of data associated with the second Web application through the user interface of the browser;
resuming the first Web application after the second Web application completes processing, the resuming comprising connecting to the saved URL of the first Web application from the client machine;
terminating the suspended first Web application if a predetermined time value has been exceeded since suspension of the first Web application; and
saving for the first Web application, a session identification value and a corresponding state, the state representative of the first Web application before terminating the first Web application.

17. The computer-readable medium of claim 16, wherein suspending further comprises: suspending the operation of the first Web application by removing from a memory associated with the first Web application some of the contents of the memory.

18. The computer-readable medium of claim 16, wherein resuming further comprises: resuming the first Web application based on the saved URL and a window identification value, when another event indicates a request to the first Web application.

* * * * *